United States Patent [19]

Hokans

[11] 4,073,503
[45] Feb. 14, 1978

[54] MOTORCYCLE SIDECAR MOUNTING BRACKET

[76] Inventor: David H. Hokans, Rte. 3, Box 228A, Plant City, Fla. 33566

[21] Appl. No.: 669,978

[22] Filed: Mar. 24, 1976

[51] Int. Cl.² ............................................. B62K 27/12
[52] U.S. Cl. .................................. 280/203; 280/281 R
[58] Field of Search ............................... 280/203, 281

[56] References Cited
U.S. PATENT DOCUMENTS

| 1,094,777 | 4/1914 | Buckland | 280/203 |
| 1,388,387 | 8/1921 | Swan et al. | 280/203 |

FOREIGN PATENT DOCUMENTS

| 919,426 | 3/1947 | France | 280/203 |
| 19,136 of | 1912 | United Kingdom | 280/203 |
| 412,902 | 7/1934 | United Kingdom | 280/203 |

Primary Examiner—Joseph F. Peters, Jr.
Assistant Examiner—Terrance L. Siemens
Attorney, Agent, or Firm—Arthur Gershman

[57] ABSTRACT

A motorcycle sidecar mounting bracket has means which permit the motorcycle to tilt relative to the sidecar. Two bracket members which connect the sidecar with the motorcycle are pivotally mounted on the underside of the motorcycle. As the motorcyclist leans the motorcycle into a turn, the brackets remain horizontal while the motorcycle tilts independently of the sidecar.

14 Claims, 6 Drawing Figures

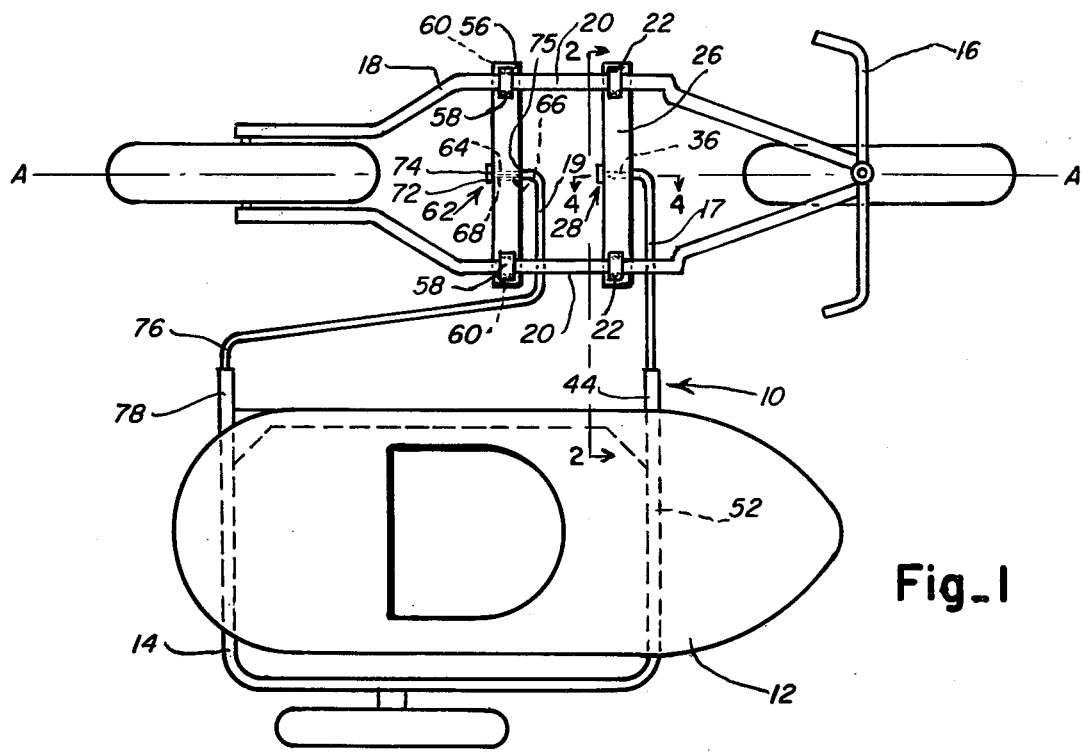
Fig_1
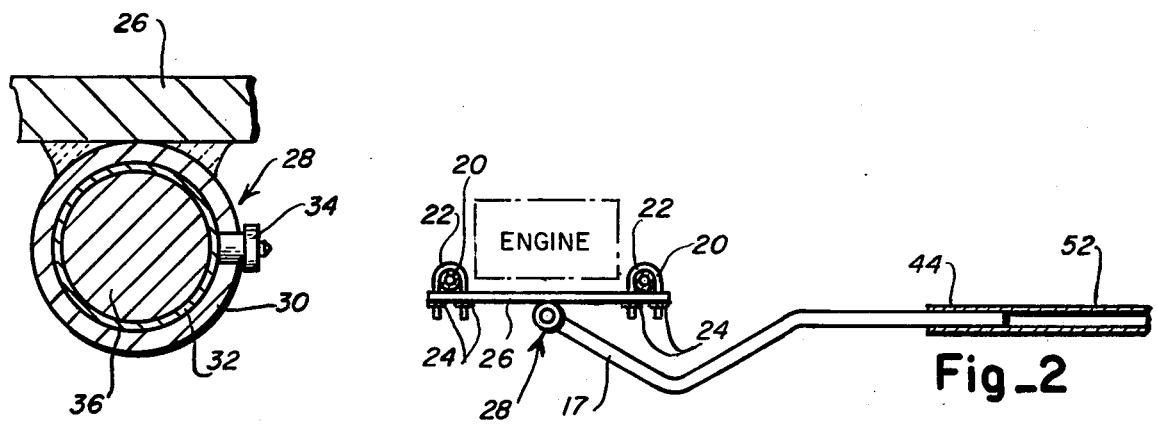
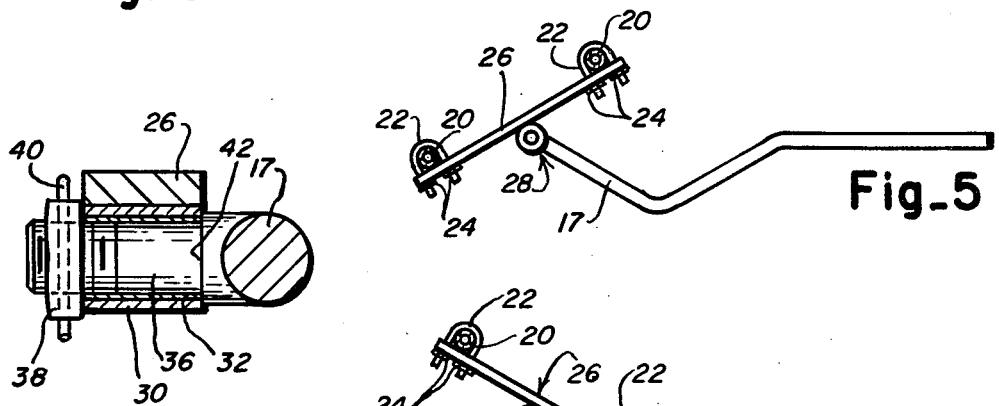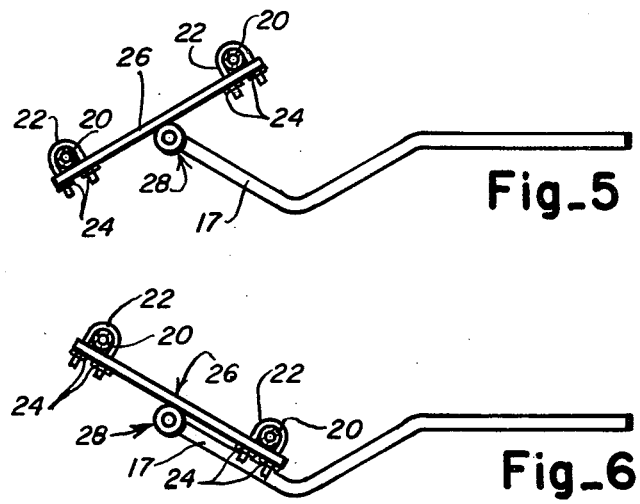

MOTORCYCLE SIDECAR MOUNTING BRACKET

BACKGROUND

This invention relates to a bracket for mounting a sidecar to a motorcycle, and more particularly for mounting the motorcycle sidecar in a manner which allows the motorcycle to tilt relative to the sidecar. Previous motorcycle sidecar mounting brackets have rigidly fixed the sidecar to the motorcycle by bolting two rigid members between the motorcycle and the sidecar. The previous rigid brackets were unsafe, difficult to use and took much of the enjoyment out of cycling for both the motorcyclist and the passenger in the sidecar. Because of the rigid connection, both the motorcycle and sidecar remained essentially vertical both during normal driving and turning. The rigid connection particularly adversely affected turning of the motorcycle, since the motorcycle operator had to turn the handlebars in the desired turn direction rather than leaning the bike into the turn. The motorcycle tended to tip over and the motorcyclist was required to make turns extremely slowly with great caution and with an ungraceful, jerking movement. Safety, ease of operation, and enjoyment were thus curtailed.

SUMMARY OF THE INVENTION

Briefly, the invention of a motorcycle sidecar mounting bracket has means which permit the motorcycle to tilt relative to the sidecar. The bracket has front and rear bracket members which are pivotally connected to front and rear crossbars mounted on the underside of the motorcycle frame. The pivotal connections comprise an end of each bracket member which is inserted into and rotates in a bushing which is welded to the crossbar. The pivotal connections are each disposed so that their axes are on the center line of the motorcycle. The bracket members extend away from the motorcycle and toward the sidecar to which the bracket members are coupled. As the motorcyclist leans the motorcycle into a turn, the bracket members remain horizontal while the crossbars tilt with the motorcycle, with crossbar mounted bushing pivoting about the stationary bracket member ends. The motorcycle thus tilts independently of the sidecar while remaining connected to the sidecar, permitting safe, easy and enjoyable operation of the sidecar equipped motorcycle.

OBJECTS OF THE INVENTION

An object of the invention is to provide a flexible motorcycle sidecar mounting bracket.

Another object of the invention is to provide a motorcycle sidecar coupling which is safe in operation and which enhances the enjoyment of operation of a sidecar equipped motorcycle.

Still another object of the invention is to provide a motorcycle sidecar coupling which allows the motorcycle to lean into a turn while the sidecar remains vertical.

Yet another object of the invention is to provide a sidecar coupling which permits the motorcycle to tilt relative to the sidecar.

Yet another object of the invention is to provide a motorcycle sidecar mounting bracket which is fixed to the motorcycle frame along the center line of the motorcycle.

Still another object of the invention is to mount a sidecar to a motorcycle by means which absorb the inertia of the sidecar during acceleration and deceleration.

Other objects and many of the attendant advantages of the present invention will become apparent to those skilled in the art from a reading of the following detailed description taken in conjunction with the accompanying drawing wherein like reference characters designate like parts and primed reference characters designate equivalent parts and wherein:

BRIEF DESCRIPTION OF THE DRAWING

FIG. 1 is a plan view of a sidecar mounted to a motorcycle by a bracket made in accordance with the invention.

FIG. 2 is a sectional view taken along line 2—2 of FIG. 1 showing a side view of one portion of the motorcycle sidecar bracket of the invention with the motorcycle and sidecar in vertical position.

FIG. 3 is a detail of FIG. 2 showing the pivotal connection of the bracket of the invention.

FIG. 4 is a sectional view taken along line 4—4 of FIG. 1 showing a longitudinal section of the pivotal connection between the front bracket member and the front crossbar.

FIG. 5 is a view similar to FIG. 2 showing one portion of the bracket during turning of the motorcycle to the left.

FIG. 6 is a similar view showing turning of the motorcycle to the right.

DETAILED DESCRIPTION OF THE INVENTION

With reference to FIG. 1, a flexible motorcycle sidecar bracket according to the invention is illustrated generally by numeral 10, coupling a motorcycle sidecar 12 having a sidecar frame 14 to a motorcycle 16 having a motorcycle frame 18.

Motorcycle sidecar bracket 10 generally comprises strong flexible front and rear bracket members 17, 19 each having means for connecting the bracket members to the sidecar frame, front and rear crossbars 26, 56 mounted on the motorcycle frame, and pivotal connections 28, 62 for pivotally connecting bracket members 17, 19 with crossbars 26, 56.

Referring now to FIG. 2 in conjunction with FIG. 1, front crossbar 26 of motorcycle sidecar coupling 10 is shown extending between tubular portions 20 on the underside of motorcycle frame member 18 and is connected to tubular portions 20 by a pair of U-bolts 22 each having four fasteners 24, as is known in the art. U-bolts 22 may be of any convenient dimension which accommodates tubular portions 20 of the motorcycle frame 18 to which it is desired to mount sidecar 12.

Front bracket member 17 is made of a strong flexible material, preferably a tubular steel rod or a flat steel strip which is sufficiently strong to carry a sidecar under road conditions yet which is sufficiently flexible to absorb the forces of acceleration as described hereinafter.

Front crossbar 26 is made of a strong rigid material, preferably a thick steel plate which is sufficiently long to span the distance between tubular members 20.

Fixed to the underside of front crossbar 26 is pivot connection 28, shown in greater detail in FIG. 3, connecting front bracket member 17 with the front crossbar. Pivot connection 28 has an outer tubular member 30 and a concentric inner bushing 32. Pivot connection 28 is preferably supplied with a grease fitting 34 for lubrication of bushing 32, which is preferably made of bronze. Pivot connection 28 is fixed to front crossbar 26 by any suitable means, but preferably by welding outer tubular member 30 to the underside of the front crossbar.

With further reference to FIG. 4, front bracket member 17 has a reduced end portion 36 having an outer diameter smaller than the inner diameter of bushing 32, allowing end portion 36 to be received in bushing 32 and allowing relatively friction-free pivotal motion therebetween.

End portion 36 is threaded at its extremity and has a drilled hole for the receipt of a castle nut 38 and cotter pin 40 and terminates at the other end in a shoulder 42 for retention of reduced end portion 36 of front bracket member 17 in pivot connection 28.

Front bracket member 17 is connected with sidecar frame 14 by a compression connection 44 which is known in the art and which forms a frictional connection between the front bracket member and an extension 52 of sidecar frame 14. Compression connection 44 allows the frictional connection to be varied to give the desired "toe-in" to minimize tire wear.

Rear bracket member 19 is connected to tubular members 20 of motorcycle frame 14 in similar fashion to the connection of front bracket member 17 to frame 14. A rear crossbar 56 spans tubular members 20 and is connected thereto by a pair of U-bolts 58 each of which is fastened to rear crossbar 56 by fastening means 60 at four places. A pivot connection 62 is fastened to the underside of rear crossbar 56. Pivot connection 62 has an outer tubular member 64 and a concentric inner bushing 66 for receipt of a reduced end portion 68 of rear bracket member 19. Reduced end portion 68 is threaded at its end and a castle nut 72 and cotter pin 74 cooperate with a shoulder 75 to retain reduced end portion 68 within pivot connection 62.

Rear bracket member 19 extends rearwardly and toward the sidecar, terminating in a coupling portion 76 which is rigidly connected to a rear extension 78 of a sidecar frame 14 by conventional fasteners, such as bolts.

Pivot connections 28 and 62 are fixed midway between the ends of front crossbar 26 and rear crossbar 56, respectively. Thus mounted, the pivot connections are located on the central longitudinal axis A—A (FIG. 1) of the motorcycle. This arrangement lends great stability to the motorcycle and sidecar unit, as well as facilitating handling of the unit.

In operation, when the motorcycle is accelerated, strong, flexible bracket members 17, 19 will allow the inertia of the sidecar to cause the sidecar to lag slightly behind the motorcycle, absorbing some of the bending movement tending to force the motorcycle to the left as shown in FIG. 1. A jerky start, which may result in an unsafe condition is thus avoided. As the motorcycle obtains cruising speed, the elasticity of the bracket members returns the sidecar to a normal position. A similar effect will occur during deceleration of the motorcycle, avoiding another potentially dangerous situation. When making a turn to the left, as shown in FIG. 5, pivot connections 28 and 62 allow the motorcycle to lean into the turn, while the combination of the rigid coupling at rear bracket member coupling portion 76, compression connection 44, and strong, flexible bracket members 17, 19 allow the sidecar to remain vertical and to smoothly make the turn, lagging slightly behind the motorcycle. A similar effect takes place when the motorcycle turns to the right, as shown in FIG. 6, with the additional advantage that the turning radius is greatly reduced, permitting extremely tight turning in this direction.

I claim:

1. A bracket for mounting the frame of a motorcycle sidecar onto the frame of a motorcycle comprising;

crossbar means adapted to be rigidly mounted on the motorcycle frame, said crossbar means being mounted transversely to the central longitudinal axis of the motorcycle, bracket member means adapted to extend between the crossbar means and the sidecar frame, said bracket member means having means adapted to connect the bracket member means with the sidecar frame, a pivotal connection adapted to join said bracket member means and said crossbar means, and adapted to permit pivotal movement therebetween, thereby also permitting pivotal movement of said bracket member means with respect to said motorcycle.

2. The bracket of claim 1 wherein the crossbar means is adapted to be mounted on the motorcycle beneath the area where the engine is mounted on the motorcycle frame.

3. The bracket of claim 2 wherein the bracket means includes at least one bracket member terminating in a tubular end portion, said tubular end portion being received in a bushing surrounded by a cylindrical sleeve rigidly fixed to said crossbar means and wherein means are provided for retaining said end portion in said bushing.

4. The bracket of claim 3 wherein said tubular end portion is of reduced diameter, forming a shoulder, and the end of said end portion is threaded and provided with a drilled hole for the receipt of a castle nut and cotter pin whereby said end portion is retained is said bushing between said shoulder and said castle nut.

5. The bracket of claim 4 wherein said bracket member is made of a strong, flexible material, thereby absorbing inertial bending movements between the sidecar and the motorcycle during acceleration and deceleration.

6. The bracket of claim 5 wherein said means adapted to connect said bracket member to said sidecar frame includes a compression connection for toe-in adjustment.

7. The bracket of claim 6 wherein said crossbar means comprises first and second crossbars, said bracket member means comprises first and second bracket members and said first bracket member is pivotally connected with said first crossbar and said second bracket member is pivotally connected with said second crossbar.

8. In combination, a bracket for mounting the frame of a motorcycle sidecar onto the frame of a motorcycle comprising;

crossbar means rigidly mounted on the motorcycle frame, said crossbar means being mounted transversely to the central longitudinal axis of the motorcycle, bracket member means extending between the crossbar means and the sidecar frame, said bracket member means having means for connecting the bracket member means with the sidecar frame, a pivotal connection joining said bracket member means and said crossbar means, and permitting pivotal movement therebetween, thereby also permitting pivotal movement of said bracket member means with respect to said motorcycle.

9. The combination of claim 8 wherein the crossbar means is mounted on the motorcycle beneath the area where the engine is mounted on the motorcycle frame.

10. The combination of claim 9 wherein the bracket means includes at least one bracket member terminating in a tubular end portion, said tubular end portion being received in a bushing surrounded by a cylindrical sleeve rigidly fixed to said crossbar means and wherein means are provided for retaining said end portion in said bushing.

11. The combination of claim 10 wherein said tubular end portion is of reduced diameter, forming a shoulder, and the end of said end portion is threaded and provided with a drilled hole for the receipt of a castle nut and cotter pin whereby said end portion is retained in said bushing between said shoulder and said castle nut.

12. The combination of claim 11 wherein said bracket member is made of strong, flexible material, thereby absorbing inertial bending movements between the sidecar and the motorcycle during acceleration and deceleration.

13. The combination of claim 12 wherein said means connecting said bracket member to said sidecar frame includes a compression connection for toe-in adjustment.

14. The combination of claim 13 wherein said crossbar means comprises first and second crossbars, said bracket member means comprises first and second bracket members and said first bracket member is pivotally connected with said first crossbar and said second bracket member is pivotally connected with said second crossbar.

* * * * *